B. T. BABBITT.
VEHICLE-AXLES.

No. 194,398. Patented Aug. 21, 1877.

Witnesses:
John Becker
Fred Haynes

Inventor
B. T. Babbitt
by his Attorneys
Brown & Allen

UNITED STATES PATENT OFFICE.

BENJAMIN T. BABBITT, OF NEW YORK, N. Y.

IMPROVEMENT IN VEHICLE-AXLES.

Specification forming part of Letters Patent No. 194,398, dated August 21, 1877; application filed March 16, 1877.

*To all whom it may concern:*

Be it known that I, BENJAMIN T. BABBITT, of the city, county, and State of New York, have invented a new and useful Improvement in Axles for Wagons and other Vehicles, of which the following is a description, reference being had to the accompanying drawings, forming part of this specification.

This invention is more particularly intended for wagons, drays, and vehicles designed to carry heavy loads on common roads, but it is also applicable to railroad-cars and wheel-vehicles generally.

The invention consists in a sectionally-constructed axle composed of a main portion or body, outer end sections or portions carrying the wheels of the vehicle, and an elastic coupling or connection formed of a box and flange-joint arranged at the junction of the axle-body with the end sections, and in which the flange is embedded in an india-rubber or other like elastic filling inclosed by the box.

An axle thus constructed provides in a most efficient manner for the yielding in various directions of the ends of the axles which carry the wheels, without straining on the body of the axle, whereby the running of the wheels is eased and the axle relieved from shock and protected from injury or breakage, and other advantages are obtained.

Figure 1:
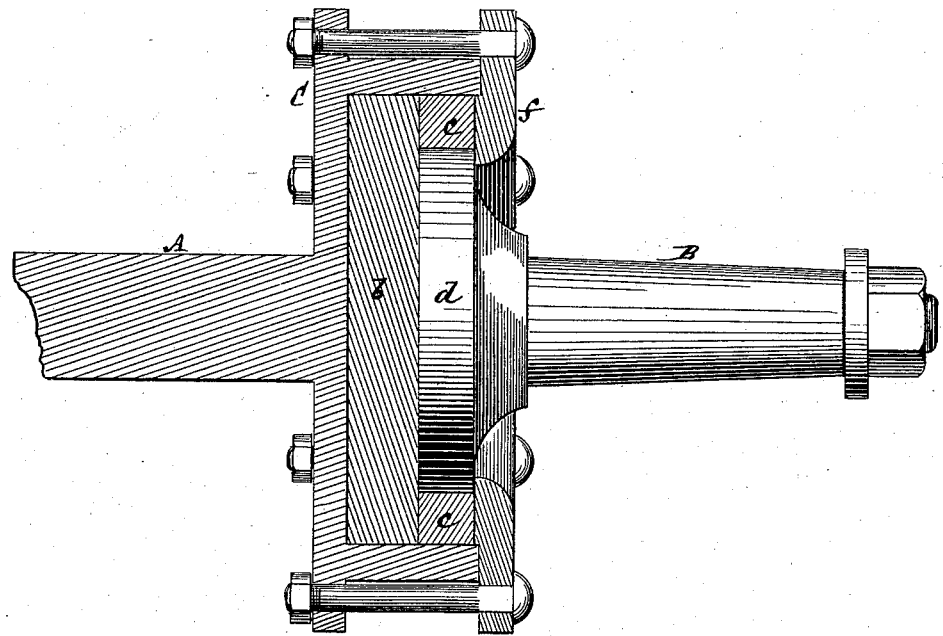
Figure 2:
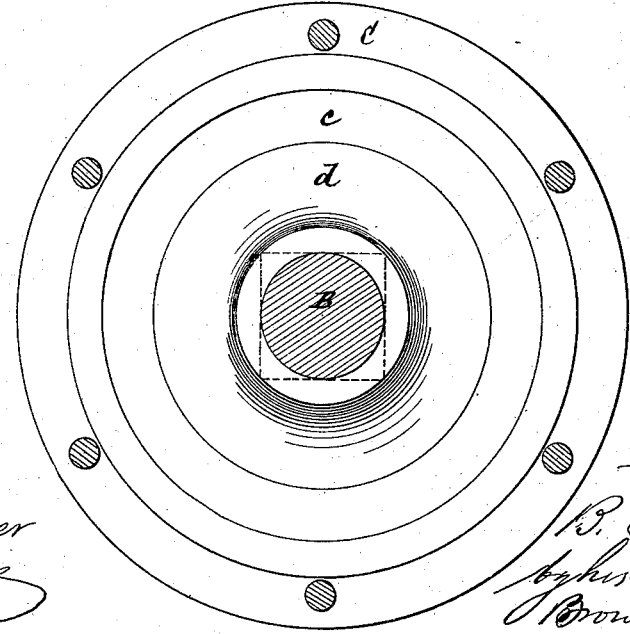

Figure 1 represents a partly sectional longitudinal view of one end of a wagon-axle constructed in accordance with my invention; and Fig. 2 an outer sectional end view of the same, with a certain cap-ring, forming a part of the construction, removed.

A is the main portion or body of the axle, and B one of the wheel-carrying ends thereof. Both ends, B, of the axle are similarly constructed, and are formed of separate pieces or sections from the body A.

Fast on each end of the body A is a box, C, which is fitted with a filling of india-rubber, composed of a flat backing or disk, $b$, and an outer ring, $c$, on the face of said disk, thereby forming a cup-shaped elastic filling which may, if desired, be made in one piece.

The inner end of each independent end axle-section B is formed or provided with a flange, $d$, which fits snugly within the cavity formed by the elastic disk $b$ and ring $c$ of the box-filling, and is held therein and the filling retained in its place by a cap-ring, $f$, which is bolted to the box C on its outer face, and which overlaps the back of the flange $d$.

From this description it will be seen that the end sections B of the axle which carry the wheels of the vehicle are independently supported, through their flanges $d$, by the elastic filling $b\ c$ of the box C, and that said end axle-sections B are capable of yielding in various directions, or universally adjusting themselves, as it were, to different pressures or strains thrown on the wheels without producing any severe strain on the body A of the axle. This yielding or self-accommodating action of the end axle-sections B, however, is not sufficient to materially disturb the true running of the wheels, and, besides protecting the axle from injury or breakage under rude shocks or heavy loads, the elastic coupling or connection formed by the box and flange-joint and elastic box-filling at the junction of the main body of the axle with the independent end sections thereof, deadens or prevents communication of all jar or shock, consequent on the running of the vehicle, to the interior of the latter or its contents.

When the invention is applied to a railroad-car having its wheels fast on the end sections B, then provision should be made for supporting said end sections in suitable outer bearings.

I claim—

In a compound axle composed of three parts, viz., a main portion or body, A, and independent wheel-carrying sections B at opposite ends of said body, the combination, with said body A and either wheel-carrying end section B, of a box and flange-joint and an interposed packing or filling, $b\ c$, of india-rubber or other like elastic material, constructed to receive the flange $d$ of the joint within it, substantially as and for the purposes herein set forth.

BENJ. T. BABBITT.

Witnesses:
HENRY T. BROWN,
FRED. HAYNES.